United States Patent
Alkhalili et al.

(10) Patent No.: US 7,136,109 B2
(45) Date of Patent: Nov. 14, 2006

(54) SELF-ADJUSTING PIXEL CLOCK AND METHOD THEREFOR

(75) Inventors: Mohammad Alkhalili, Dumont, NJ (US); David Rowe, Campbell Hall, NY (US)

(73) Assignee: Pelco, Clovis, CA (US)

( * ) Notice: Subject to any disclaimer, the term of this patent is extended or adjusted under 35 U.S.C. 154(b) by 258 days.

(21) Appl. No.: 10/392,658

(22) Filed: Mar. 20, 2003

(65) Prior Publication Data

US 2003/0179318 A1 Sep. 25, 2003

Related U.S. Application Data

(60) Provisional application No. 60/366,677, filed on Mar. 22, 2002.

(51) Int. Cl.
H04N 5/04 (2006.01)
H04N 5/06 (2006.01)

(52) U.S. Cl. ............... 348/537; 348/536; 348/512; 327/156

(58) Field of Classification Search ............ 348/537, 348/536, 521, 512, 569, 589, 600, 567, 720, 348/718; 327/156, 147, 159, 150, 158, 149, 327/141; 375/371, 376; 455/260, 262, 264; 345/698, 213, 636, 641

See application file for complete search history.

(56) References Cited

U.S. PATENT DOCUMENTS

| | | | | |
|---|---|---|---|---|
| 4,623,925 A * | 11/1986 | Tults | ................ | 348/537 |
| 4,635,000 A * | 1/1987 | Swanberg | ................ | 331/10 |
| 4,663,523 A * | 5/1987 | Swanberg | ................ | 250/235 |
| 4,694,156 A * | 9/1987 | Swanberg | ............ | 250/214 RC |
| 5,036,216 A * | 7/1991 | Hohmann et al. | ............ | 327/157 |
| 5,136,260 A * | 8/1992 | Yousefi-Elezei | ............ | 331/17 |
| 5,523,792 A * | 6/1996 | Ciardi et al. | ............ | 348/505 |
| 5,731,843 A * | 3/1998 | Cappels, Sr. | ............ | 348/537 |
| 5,767,916 A * | 6/1998 | West | ............ | 348/537 |
| 5,805,233 A * | 9/1998 | West | ............ | 348/537 |
| 5,825,431 A * | 10/1998 | Walker | ............ | 348/536 |
| 6,226,045 B1* | 5/2001 | Vidovich | ............ | 348/539 |
| 6,420,918 B1* | 7/2002 | Altmanshofer et al. | ..... | 327/156 |
| 6,573,944 B1* | 6/2003 | Altmanshofer et al. | ..... | 348/542 |
| 6,731,343 B1* | 5/2004 | Yoneno | ............ | 348/537 |
| 6,943,844 B1* | 9/2005 | Cahill, III | ............ | 348/537 |
| 2003/0118141 A1* | 6/2003 | Neary | ............ | 375/376 |

* cited by examiner

*Primary Examiner*—John Miller
*Assistant Examiner*—Jean W. Désir
(74) *Attorney, Agent, or Firm*—Gunster, Yoakley & Stewart, P.A.

(57) ABSTRACT

A pixel clock generating circuit is provided in which a digital circuit generates a first signal corresponding to the relative frequency of the pixel clock as compared with a predetermined desired pixel clock frequency. An analog circuit is electrically coupled to the digital circuit in which the analog circuit has a reverse biased variable capacitance device, an integrator and a comparator circuit. The reverse biased variable capacitance device has an anode and a cathode. The integrator has an input coupled to the digital circuit and an output coupled to the cathode of the reverse biased variable capacitor. The integrator is arranged to integrate the first signal received from the digital circuit and produce an output voltage across the reverse biased variable capacitance device such that the output voltage causes the capacitance of the reverse biased capacitor to change if the pixel clock is not operating at the predetermined desired pixel clock frequency. The comparator circuit is electrically coupled to the anode of the reverse biased variable capacitor and produces the pixel clock having a frequency based on the capacitance of the reverse biased capacitor.

24 Claims, 4 Drawing Sheets

SELF-ADJUSTING PIXEL CLOCK AND METHOD THEREFOR

CROSS-REFERENCE TO RELATED APPLICATION

This application is related to and claims priority to U.S. Provisional Patent Application Ser. No. 60/366,677, filed Mar. 22, 2002, entitled SELF ADJUSTING PIXEL CLOCK, the entirety of which is incorporated herein by reference.

STATEMENT REGARDING FEDERALLY SPONSORED RESEARCH OR DEVELOPMENT n/a

1. Field of the Invention

The present invention relates to video display character generation, and in particular to a self-adjusting pixel clock circuit and method therefore.

2. Background of the Invention

Video displays, such as those used in closed circuit television (CCTV) systems, are often arranged to display graphical characters, such as alphanumeric text, icons, etc., superimposed (or overlaid) over a video signal captured by a camera or merely displayed on the screen superimposed over a suitable background. The video display screen area is logically divided into a grid, with each grid element, or pixel, designated by a row and column location on the screen. Video overlay circuitry and software in the CCTV system causes a desired effect to occur in each pixel, for example, turning a pixel a color or making no change to the pixel grid location. Arranging a series of pixels with a particular color or colors, creates the desired superimposed character.

In order to create the characters at the desired locations on the display screen, it is necessary to use a clock to synchronize the character display with a known reference, such as the horizontal synchronization pulse used by the monitor. This clock is referred to as a pixel clock.

Known pixel clock designs employ a sample and hold oscillator with Schmitt inverter and a potentiometer. These components are sensitive to temperature fluctuations and therefore suffer from temperature stability problems. In addition, variations in the internal hysteresis of various manufacturer's Schmitt inverters make it impossible to select a predetermined external time constant for the target frequency. An undesirable result is that a potentiometer must be used to manually adjust the pixel clock to provide the character output at the desired screen location.

Because the pixel clock generating circuit is used for displaying characters on CCTV video images in National Television Standards Committee (NTSC) and Phase Alternating Line (PAL) modes, it is important that the pixel clock is stopped during the horizontal video synchronization pulses. It is just as important that the pixel clock starts in the same phase every time it starts. If not, the characters will appear on the display with wavy vertical edges and/or will not appear in the location on the display intended by the manufacturer.

Ideally, the pixel clock should be immune from temperature variation. Operating temperature variation causes the clock to speed up or slow down. Based on current television standards, if the pixel clock slows down below 11 MHz, it will result in an attempt to display rows of characters which stretch out past the occurrence of horizontal synchronization pulses. If, on the other hand, the pixel clock speeds up, it will cause the characters to shrink to an unacceptable appearance. In other words, a fast clock shrinks the overlay in the horizontal sense and a slow clock expands the overlay in the horizontal sense.

The elimination of the potentiometer would reduce the steps necessary to adjust the circuit during production and operation. It is therefore desirable to have a pixel clock circuit which eliminates the need to manually adjust the pixel clock during production and well as make the pixel clock circuit thermally stable.

Further, the addition of components such as potentiometer and the need to have experienced technicians calibrate the pixel clock adds to the complexity and cost of production of CCTV systems. As such, it is further desirable to have a pixel clock circuit which is of low cost to produce and which occupies small printed circuit board real estate.

SUMMARY OF THE INVENTION

In accordance with an aspect, the present invention provides a pixel clock generating circuit in which a digital circuit generates a first signal. The first signal corresponds to the relative frequency of the pixel clock as compared with a predetermined desired pixel clock frequency. An analog circuit is electrically coupled to the digital circuit in which the analog circuit has a reverse biased variable capacitance device having an anode and a cathode, an integrator having an input coupled to the digital circuit and an output coupled to the cathode of the reverse biased variable capacitor and a comparator circuit electrically coupled to the anode of the reverse biased variable capacitor. The integrator is arranged to integrate the first signal received from the digital circuit and produce an output voltage across the reverse biased variable capacitance device such that the output voltage causes the capacitance of the reverse biased capacitor to change if the pixel clock is not operating at the predetermined desired pixel clock frequency. The comparator circuit produces the pixel clock having a frequency based on the capacitance of the reverse biased capacitor.

In accordance with an another aspect, the present invention provides a method for generating a pixel clock for use in synchronizing the display of characters on a display monitor, in which a first signal is generated. The first signal corresponds to the relative frequency of the pixel clock as compared with a predetermined desired pixel clock frequency. The first signal is integrated to produce an output voltage across a reverse biased variable capacitance device such that the output voltage causes the capacitance of the reverse biased capacitor to change if the pixel clock is not operating at the predetermined desired pixel clock frequency. The pixel clock is generated at a frequency based on the capacitance of the reverse biased capacitor.

In accordance with still another aspect, the present invention provides a video display circuit for overlaying characters with an underlying video signal for display on a display monitor, in which the video display circuit has a video controller, The video controller receives a video input and overlays character data onto the video input to create a video output. A random access memory is electrically coupled to the video controller in which the random access memory stores the overlay character data. A pixel clock generating circuit provides a clock for synchronizing retrieval of the overlay character data from the random access memory. The pixel clock generating circuit has a digital circuit generating a first signal and an analog circuit electrically coupled to the digital circuit. The first signal corresponds to the relative frequency of the pixel clock as compared with a predetermined desired pixel clock frequency. The analog circuit has a reverse biased variable capacitance device having an anode and a cathode, an integrator having an input coupled to the digital circuit and an output coupled to the cathode of the reverse biased variable capacitor and a comparator circuit electrically coupled to the anode of the reverse biased variable capacitor. The integrator is arranged to integrate the first signal received from the digital circuit and produce an output voltage across the reverse biased variable capacitance device such that the output voltage causes the capacitance of the reverse biased capacitor to change if the pixel clock is not operating at the predetermined desired pixel clock frequency. The comparator circuit produces the pixel clock having a frequency based on the capacitance of the reverse biased capacitor.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

For the sake of simplicity, the present invention is described using a 16 MHz master clock and 13.2 MHz pixel clock in which the overlay is arranged to display 32 columns of character each with 16 pixels across, or 16 columns of text with 32 pixels across. It is understood, however, that those of ordinary skill in the art can adapt the described exemplary embodiment to implement other master pixel clock frequencies, pixel clock frequencies and/or arrange the present invention to provide a different number of columns and/or pixels across each columns, depending upon the desired implementation.

Figure 1:
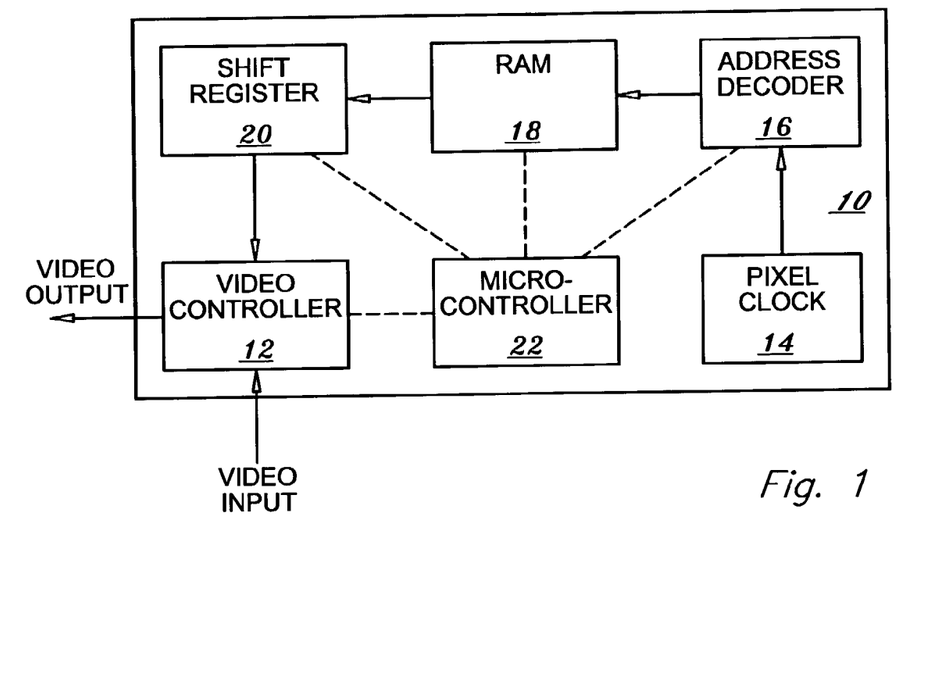
FIG. 1 is a block diagram of a video display circuit including a pixel clock generating circuit constructed in accordance with the principles of the present invention.

Referring now to the drawing figures in which like referent designators refer to like elements there is shown in FIG. 1 a video display circuit constructed in accordance with the principles of the present invention and designated generally as 10. Video display circuit 10 includes video controller 12. Video controller 12 receives an input generated by a video capture device, such as a video camera (not shown). Video controller 12 overlays character data onto the video input and creates a video output for display on a monitor. Of course, it is understood that the video input need not be an actual image. The video controller 12 can also be operated to create a character overlay onto a single or a multi-color background, for example, the graphical overlay of white text on a blue background.

Video display circuit 10 also includes pixel clock generating circuit 14, address decoder 16, random access memory (RAM) 18, shift register 20 and micro-controller 22. Pixel clock 14 generating circuit, described below in detail, provides a circuit which is self-adjusting such that it is desensitized to variations in temperature and other conditions which cause prior art pixel clock devices to fluctuate, thereby avoiding the display problems discussed above.

Pixel clock 14 generating circuit provides a clock input to address decoder 16 which is in used to provide address information to RAM 18. RAM 18 stores the graphical character overlay data for superimposition by video controller 12. The output of RAM 18 is input shift register 20 which provides input to video controller 12.

The overall operation of video display circuit 10 is controlled by micro-controller 22. Micro-controllers for use in video display systems are known and are not described herein. It is presumed that one of ordinary skill in the art could determine what capabilities are required of micro-controller 22 and could select a suitable device. Similarly, address decoder 16, RAM 18 shift register 20 and video controller 12 are components individually known in the art. As such, it is presumed that one of ordinary skill in the art could select components suitable for use in the video display circuit 10 based on the description of the present invention herein. It is further contemplated that one or more of video controller 12, pixel clock 14 generating circuit, address decoder 16, RAM 18 and shift register 20 can be implemented on one or more integrated circuit chips. In other words, although FIG. 1 shows individual elements, each of the elements described with respect to video display circuit need not be implemented individually. Video display circuit 10 may be implemented as a stand-alone system or integrated within a larger device for example, as part of a CCTV video matrix switch.

Pixel clock generating circuit 14 is described with reference to FIG. 2. Initially, it is noted an oscillator frequency can be easily divided or multiplied by an even integer, but it is difficult to generate frequencies which do not fall neatly within an even multiple of a fixed crystal oscillator's frequency. For example, an exemplary crystal oscillator used to drive video display circuit 10 may provide a 16 MHz clock. However, a pixel clock provided in a typical circuit must operate and 13.2 MHz, ±300 KHz. 13.2 MHz is not an even multiple of the 16 MHz clock. As such, additional circuitry must be provided to provide the proper pixel clock speed. As described above with respect to the prior art, these pixel clocks heretofore were temperature sensitive, expensive to produce and required manual adjustment. In contrast the pixel generating circuit 14 of the present invention is advantageously able to detect the need for adjustment, determine the amount of adjustment necessary and adjust itself to maintain the desired operating frequency.

Pixel clock generating circuit 14 includes digital section 24 and analog section 26. Digital section 24 contains digital integrated circuits and logic, primarily arranged to compare the pixel clock with the master clock and provide a resultant signal "VC" to analog section 26. VC, is an adjusting pulse used by analog section 26 to adjust the frequency of the pixel clock generated within analog section 26. As shown in FIG. 2, the pixel clock output is fed back into digital section 24.

Digital section 24 includes binary 10 bit ripple counter 28, binary 11 bit ripple counter 30, digital comparator 32 and boolean logic circuit 34. A master clock, such as the 16 MHz master clock discussed above, is fed into binary 10 bit ripple counter 28. The pixel clock, output is fed back into binary 11 bit ripple counter 30. Binary 10 bit ripple counter 28 and binary 11 bit ripple counter 30 can be any suitable ripple counters, such as those known to those of ordinary skill in the art.

Bit 10 of the binary 10 bit ripple counter 28 is input into boolean logic circuit 34. In this manner, the input to boolean logic circuit 34 from binary 10 bit ripple counter 28 toggles every 512 counts. The output from binary 11 ripple counter 30 is input into digital comparator 32. Digital comparator 32 can be any magnitude/identity comparator which is capable of comparing an 11 bit-wide signal with another signal. In the case of the present invention, digital comparator 32 compares the 11 bit output from binary 11 bit ripple counter 30 with a known reference value, namely, 422 as described below. The derivation of the comparison of the 512 count with the 422 count is shown by the following:

$$\frac{1}{16 \text{ MHz}} \times 512 \text{ cycles} \simeq \frac{1}{13.2 \text{ MHz}} \times 422 \text{ cycles} \simeq 32 \text{ us}$$

Recalling that an objective is to base the 13.2 MHz pixel clock on the 16 MHz crystal oscillator, it is shown that 512 cycles of a 16 MHz crystal oscillator is approximately equal to 422 cycles of a 13.2 MHz pixel clock, both of which complete these cycles counts in 32 micro-seconds.

Figure 2:
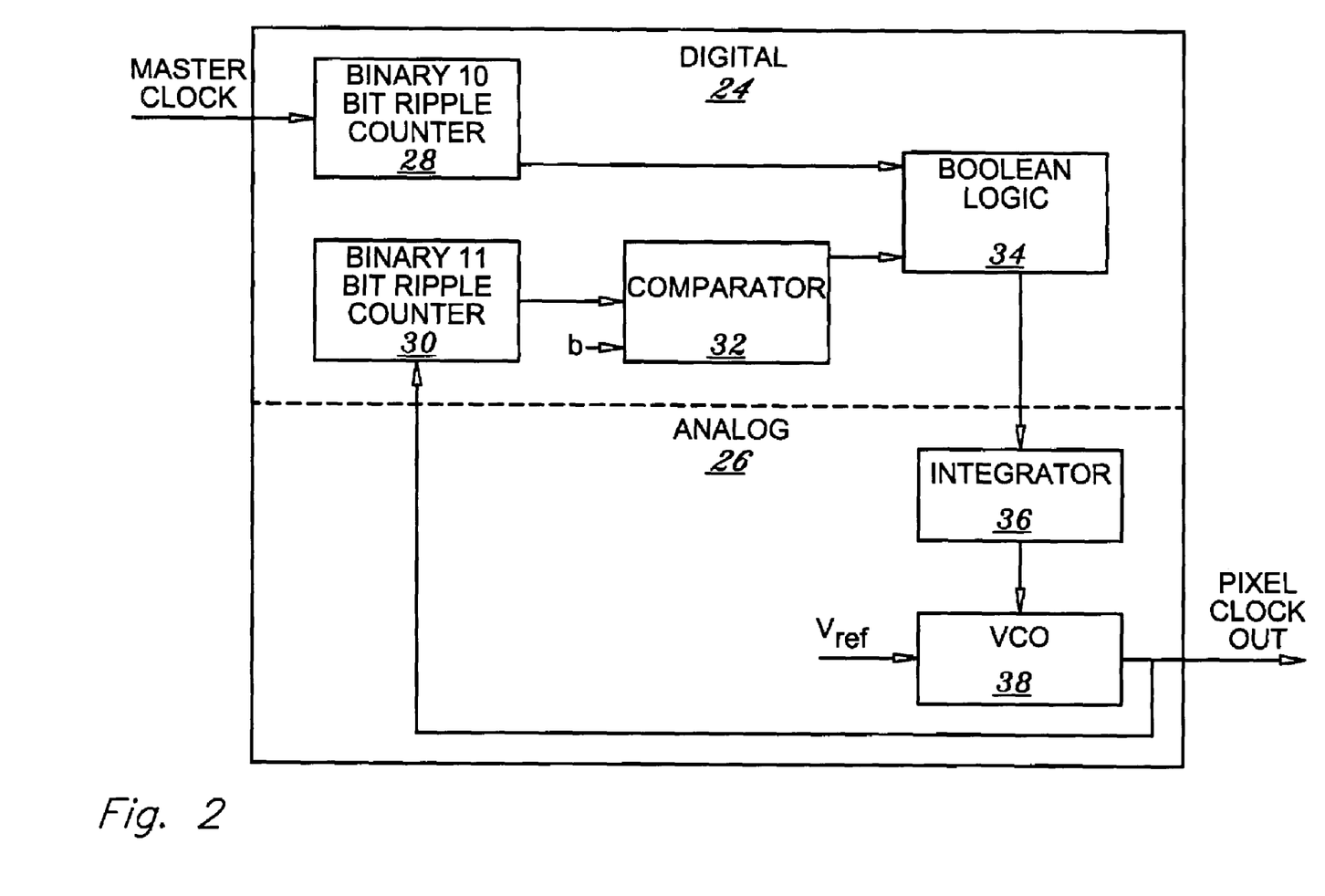
FIG. 2 is a block diagram of the pixel clock generating circuit of FIG. 1.

As is shown in FIG. 2, the output of digital comparator 32 is input into boolean logic circuit 34. Although not shown in FIG. 2, it is understood that the output of digital comparator 32 is comprised of multiple outputs. For example an output signal is generated when the binary 11 bit ripple counter 30 output "a" is less than the reference count "b" of 422, e.g., a<b, and generates a separate signal in the case where the output of binary 11 bit ripple counter 30 greater than the reference value of 422, e.g., a>b. Although not shown in FIG. 2, digital section 24 may be arranged to include delay circuits, such as d-flipflops between digital comparator 32 and boolean logic circuit 34 to add clock delay to synchronize the various outputs of the comparator with the corresponding inputs to the boolean logic circuit 34 elements.

Figure 3:
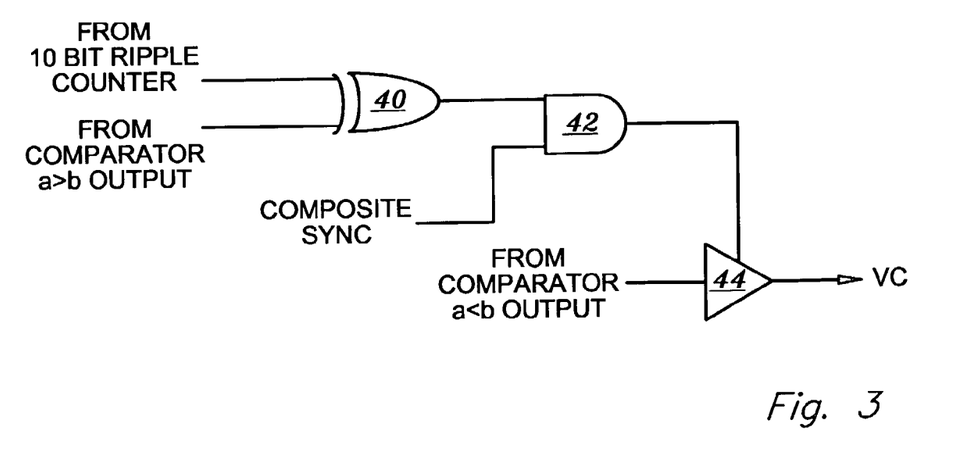
FIG. 3 is a schematic diagram of the Boolean logic circuit of FIG. 2.

The configuration of boolean logic circuit 34 is described with reference to FIG. 3. Boolean logic circuit 34 includes exclusive OR (XOR) gate 40, AND gate 42 and tri-state buffer 44. XOR gate 40 has 2 inputs, one from 10 bit ripple counter 28 and the other being the output from digital comparator 32 in which a>b (the count is greater than the 422 reference value). The output of XOR gate is fed into an input of AND gate 42. AND gate 42 also includes an input for receiving a composite synchronization pulse. The composite synchronization pulse is preferably generated every horizontal scan line. This enables pixel clock to be synchronized with the start of a new video scan line. The output of AND gate 42 is used to drive the output enabling signal line of tri-state buffer 44. As is shown in FIG. 3 the input of tri-state buffer 44 is the output from digital comparator 32 in which a<b (the count is less than the reference count of 422). The resultant output of tri-state buffer 44 is signal VC.

Adjusting pulse signal VC therefore comprises two elements which represent the comparison of the pixel clock with the reference master clock. The width of VC pulses corresponds to whether the pixel clock is operating faster or closer than its desired frequency. The polarity of the VC pulse corresponds to whether the condition of the clock is too fast or too slow. In other words, the width of the VC pulses correspond to the magnitude of the fastness or slowness of the pixel clock and the polarity corresponds to whether the magnitude represents a fast magnitude or slow magnitude.

Figure 4:
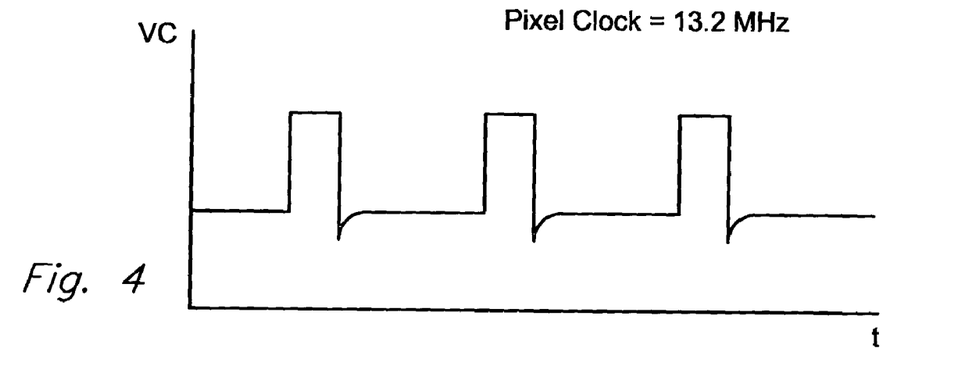
FIG. 4 is a diagram of an exemplary waveform of signal VC when the frequency of the pixel clock output signal is slower than a predetermined value.

Examples of signal VC for the various possible states of the pixel clock are shown and described with reference to FIGS. 4–6. FIG. 4 is a diagram of an exemplary wave of signal VC when the frequency of the pixel clock output signal is slower than a predetermined value, for example 13.2 MHz. As is shown in FIG. 4, signal VC a positive pulse as evidenced by the ring on the negative-going edge of the pulse. Failure to adjust the pixel clock frequency in the situation would result in the enlargement of the overlay. The greater the deviation from 13.2 MHz the wider each VC pulse would appear.

Figure 5:
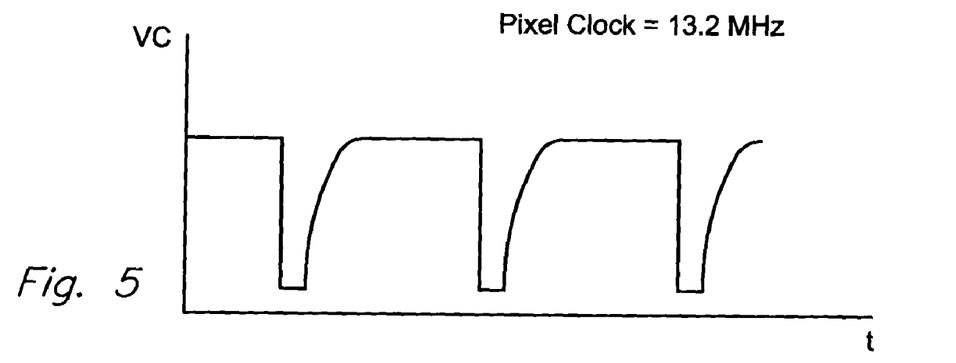
FIG. 5 is a diagram of an exemplary waveform of signal VC when the frequency of the pixel clock output signal is faster than the predetermined value.

FIG. 5 is a diagram of an exemplary wave form of signal VC when the frequency of the pixel clock output signal is faster than the predetermined value, such as 13.2 MHz. As shown in FIG. 5, VC is represented by a wave form which embodies negative pulses as evidenced by the attenuated positive-going edge of each pulse. The faster the pixel clock above the desired frequency, the wider the pulses.

Figure 6:
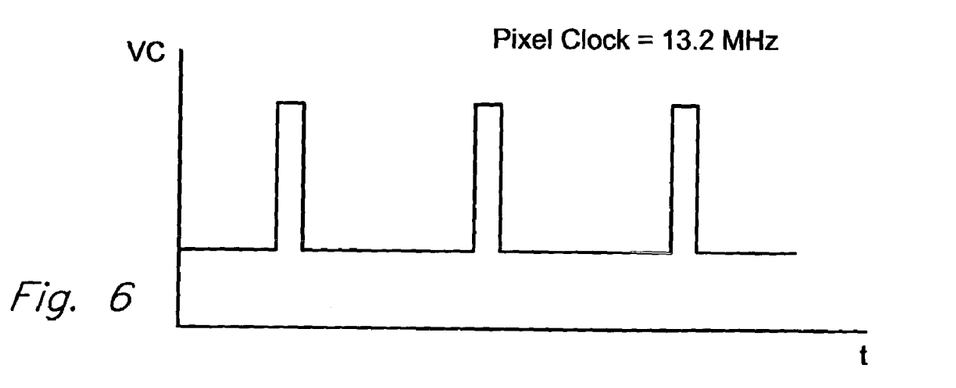
FIG. 6 is a diagram of an exemplary waveform of signal VC when the frequency of the pixel clock output signal is substantially equal to the predetermined value.

FIG. 6 is a diagram of an exemplary wave form of signal VC when the frequency of the pixel clock output signal is substantially equal to the predetermined value, such as 13.2 MHz. As shown in FIG. 6, a pixel clock which is synchronized to the desired frequency exhibits periodic, relatively square-edged pulses.

Referring again to FIG. 2, analog section 26 of pixel clock generating circuit 14 is described. Analog section 26 includes integrator 36 and voltage control oscillator ("VCO") Integator circuit 36 is arranged to receive signal VC from boolean logic circuit 34 and integrate this waveform to provide a voltage to VCO 38. VCO 38 is arranged to compare the voltage received from integrator 36 with a reference voltage $V_{ref}$ to generate the pixel clock output. In other words, the difference in voltage between the input to VCO 38 from integrator 36 and $V_{ref}$ is used to derive the pixel clock output.

Figure 7:
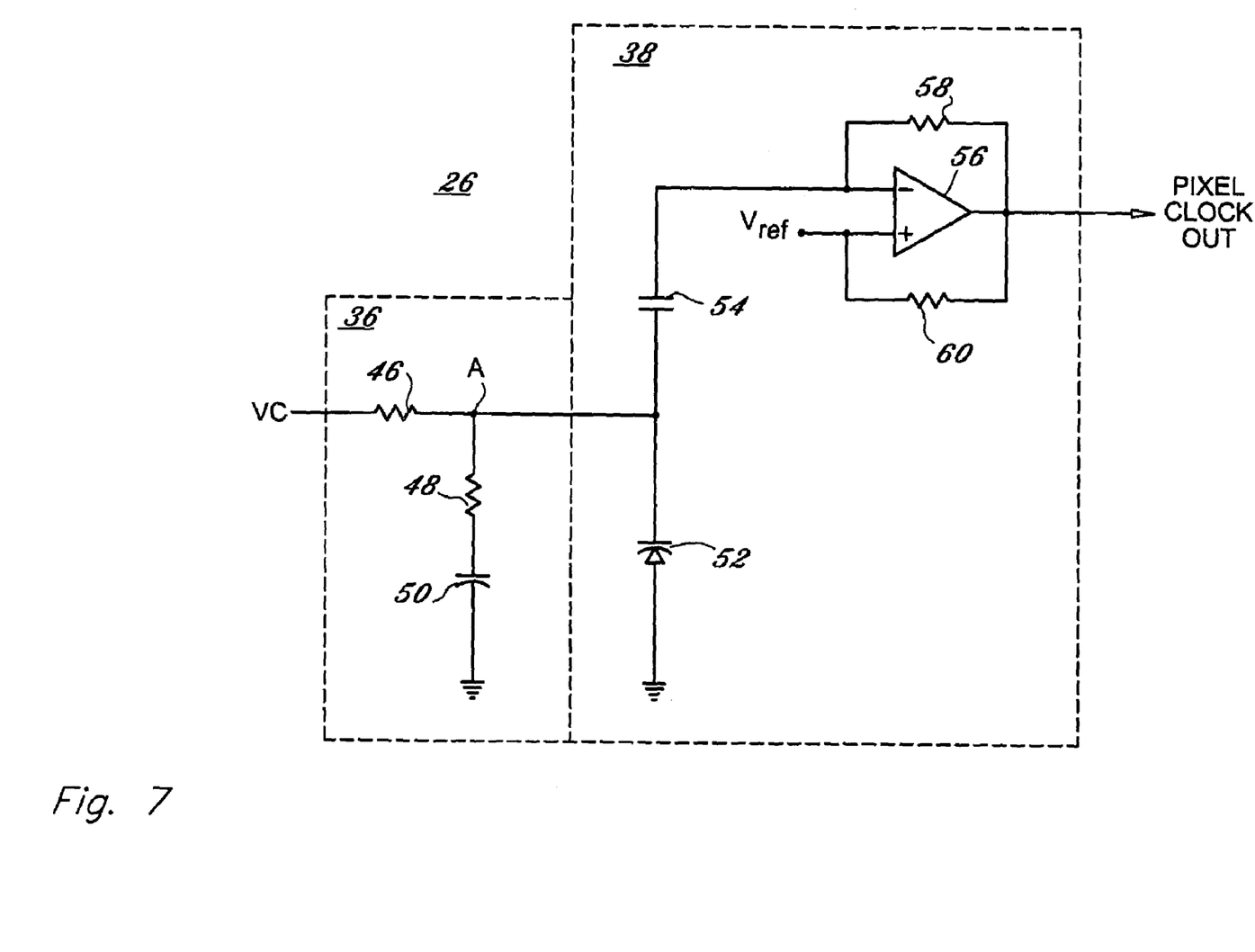
FIG. 7 is a schematic diagram of the integrator circuit and the voltage controlled oscillator circuit of FIG. 2.

Analog section 26 is described in detail with reference to FIG. 7 which is a schematic digram of integrator circuit 36 and VCO 38. As shown in FIG. 7, integrator 36 and VCO 38 are each resented by the components within the dotted lines outlining each element. Integrator circuit 36 includes input resistor 46 coupled to shunt resistor 48 which is in turn grounded through shunt capacitor 50. As such, in operation, on integrator 36 outputs a voltage at point A which represents the integrated value of signal VC.

VCO 38 includes variable capacitance diode (varicap) 52 shunted between point A and ground. Varicap 52 is reversed biased, that is its cathode is coupled to the output of integator 36 at point A and its anode is coupled to ground. VCO 38 further includes input capacitor 54, analog comparator 56, negative feedback resistor 58 and positive feedback resistor 60. Although not shown, a resistor such as a 30K ohm resistor can be used to couple the output of input resistor 46 (point A) to the cathode of varicap 52 to prevent shunt capacitor 50 from discharging. However, for the sake of simplicity, the present invention is described without this 30K ohm resistor.

Input capacitor 54 is electrically coupled between point A (the cathode of varicap 52) and the negative input of analog comparator 56. Negative feedback resistor 58 is coupled between the output of comparator 56 and the negative input of analog comparator 56. Positive feedback resistor 60 is coupled between the output of comparator 56 and the positive input of comparator 56. $V_{ref}$ is provided at the positive input of analog comparator 56.

Comparator 56 may any suitable comparator used to generate square waves, for example, a MAX 961 ultra-high speed comparator manufacturer by Maxim. It is presumed that one of ordinary skill in the art could arrange analog comparator 56 with a suitable negative feedback resistor 58 and a suitable positive feedback resistor 60 to generate a square wave at the output of analog comparator 56 based on predetermined design parameters, such as desired operating voltage level of the pixel clock and loading of the output of analog comparator 56.

Varicap 52 can be any suitable variable capacitance device whose capacitance changes based on the voltage presented at its cathode. Reversed biased varicap 52 has voltage-capacitance characteristics such that the higher reversed voltage presented across the varicap, the lower the capacitance of the device. An exemplary varicap 52 is a BB155 low-voltage variable capacitance diode manufactured by Phillips Semiconductor.

As shown such in FIG. 7, the total various capacitance between input capacitor 54 and varicap 52 as presented at the negative input of analog comparator 56 determines the frequency of the pixel clock output.

Negative feedback resistor 58 is used to desensitize the circuit to rapid changes in frequency, i.e. negative feedback resistor 58 dampens the response of analog comparator 56. In operation, the higher the capacitance presented at the negative input of analog comparator 56, the lower the frequency output by analog comparator 56 as the pixel clock out.

The operation of analog section 26 is described with reference to FIGS. 4–7. As is shown FIG. 4, when the pixel clock is slower than the desired reference frequency, a positive pulse is generated. The resultant voltage change at point A on FIG. 7 is a net increase in voltage from its previous steady state point. As such, the voltage across varicap 52 increases, thereby decreasing the capacitance of varicap 52. The decrease in capacitance of varicap 52 when summed with capacitor 54 presents a lower capacitance at the negative input of analog comparator 56 then the prior steady state. The lower capacitance increases the frequency of the pixel cock output.

As shown in FIG. 5, when the pixel clock is operating faster than the desired pixel clock reference frequency. The negative VC pulse provides a net decrease in the voltage at the output of integrator 36 at point A. The decrease in voltage across varicap 52 results in a increased capacitance value for varicap 52. The increased capacitance value of varicap 52 and capacitor 54 seen at the negative input to analog comparator 56 causes a decrease in the pixel clock output frequency from its previous steady state value. As shown in FIG. 6 a pixel clock which is operating at the desired frequency results in a VC signal which causes no change in the voltage at point A. The maintained steady state operation at point A does not effect the voltage across varicap 52, which in turn has no resultant capacitive change effect at that negative input to analog comparator 56, thereby causing no change in the pixel clock output frequency.

In sum, the integrator circuit 36 output voltage causes the capacitance of the reversed biased varicap 52 to decrease if the pixel clock frequency is slower than the desired pixel clock and the integrator circuit 36 output voltage cause the capacitance of the reversed biased variable capacitance device to increase if the pixel clock frequency is faster than the predetermined desired pixel clock frequency. Increased capacitance at the negative input to analog comparator 56 slows the pixel clock output frequency and a decrease in capacitance at the negative input to analog comparator 56 causes an increase in the pixel clock output.

The pixel clock output, as shown in FIG. 2 is fed back into binary 11 bit ripple counter 30, the feedback loop advantageously provides an arrangement which allows pixel clock 14 generating circuit to be self adjusting. This is accomplished without the need for manually adjustable potentiometers and, provides an arrangement which is desensitized to changes in temperature. The pixel clock generating circuit of the present invention also requires less circuit board real estate than prior art pixel clock circuits. It has been found that a pixel clock generating circuit constructed in accordance with the principles of the present invention remains stable for temperatures from approximately 32 degrees F to approximately 200 degrees F. The optimal operating frequency of the character generator has been found to be approximately 13.2 MHz. This frequency maximizes the size of the overlay while minimizes NTSC color crawl.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A pixel clock generating circuit, comprising:
    a digital circuit generating a first signal, the first signal corresponding to the relative frequency of the pixel clock as compared with a predetermined desired pixel clock frequency, and
    an analog circuit electrically coupled to the digital circuit, the analog circuit comprising:
        a reverse biased variable capacitance device having an anode and a cathode;
        an integrator having an input coupled to the digital circuit and an output coupled to the cathode of the reverse biased variable capacitor, the integrator arranged to integrate the first signal received from the digital circuit and produce an output voltage across the reverse biased variable capacitance device such that the output voltage causes the capacitance of the reverse biased capacitor to change if the pixel clock is not operating at the predetermined desired pixel clock frequency; and
        a comparator circuit electrically coupled to the anode of the reverse biased variable capacitor, the comparator circuit producing the pixel clock having a frequency based on the capacitance of the reverse biased capacitor.

2. The pixel clock generating circuit according to claim 1, wherein the output voltage causes the capacitance of the reverse biased variable capacitance device to decrease if the pixel clock frequency is slower than the predetermined desired pixel clock frequency and the output voltage causes the capacitance of the reverse biased variable capacitance device to increase if the pixel clock frequency is faster than the predetermined desired pixel clock frequency.

3. The pixel clock generating circuit according to claim 2, wherein the reverse biased variable capacitance device is a reverse biased variable capacitance diode.

4. The pixel clock generating circuit according to claim 2, wherein a decrease in the capacitance of the reverse biased variable capacitance device causes an increase in the pixel clock frequency and an increase in the capacitance of the reverse biased variable capacitance device causes a decrease in the pixel clock frequency.

5. The pixel clock generating circuit according to claim 1, wherein the output voltage across the reverse biased variable capacitance device is based at the least in part on a pulse width of the first signal.

6. The pixel clock generating circuit according to claim 5, wherein the output voltage across the reverse biased variable capacitance device is further based at least in part on a polarity of the first signal.

7. The pixel clock generating circuit according to claim 1, wherein the digital circuit includes:
a master clock source;
a first binary counter electrically coupled to the master clock source;
a second binary counter having:
an input electrically coupled to the pixel clock produced by the comparator circuit; and
an output;
a digital comparator electrically coupled to the output of the second binary counter, the comparator being arranged to compare the output of the second binary counter with a predetermined reference count; and
a logic circuit electrically coupled to the digital comparator and the first binary counter, the logic circuit receiving digital signals from the digital comparator and the first binary counter, the logic circuit generating the first signal based on:
a count of the first binary counter; and
a comparison of the count of the second binary counter with the predetermined reference count.

8. The pixel clock generating circuit according to claim 7, wherein the logic circuit includes an exclusive or (XOR) gate, the XOR gate producing an output signal based on a count signal received from the first binary counter and a signal received from the digital comparator corresponding to a condition in which a count of the second binary counter is greater than the predetermined reference count.

9. The pixel clock generating circuit according to claim 8, wherein the logic circuit further includes an AND gate, the and gate being electrically coupled to the XOR gate to receive the output signal there from, the AND gate being arranged to produce an output signal based on a comparison of the signal received from the XOR gate with a composite synchronization signal.

10. The pixel clock generating circuit according to claim 9, wherein the logic circuit further includes a tri-state buffer, the tri-state buffer having:
a signal input arranged to receive a signal from the digital comparator corresponding to a condition in which a count of the second binary counter is less than the predetermined reference count, the XOR gate;
a signal output; and
an enabling input which, when activated, causes a signal present at that signal input to be substantially presented at the signal output, the enabling input being electrically coupled to the AND gate to receive the output signal there from.

11. A method for generating a pixel clock for use in synchronizing the display of characters on a display monitor, the method comprising:
generating a first signal, the first signal corresponding to the relative frequency of the pixel clock as compared with a predetermined desired pixel clock frequency, and
integrating the first signal to produce an output voltage across a reverse biased variable capacitance device such that the output voltage causes the capacitance of the reverse biased capacitor to change if the pixel clock is not operating at the predetermined desired pixel clock frequency; and
generating the pixel clock at a frequency based on the capacitance of the reverse biased capacitor.

12. The method according to claim 11, further comprising:
decreasing the capacitance of the reverse biased variable capacitance device if the pixel clock frequency is slower than the predetermined desired pixel clock frequency; and
increasing the capacitance of the reverse biased variable capacitance device if the pixel clock frequency is faster than the predetermined desired pixel clock frequency.

13. The method according to claim 12, further comprising:
increasing the pixel clock frequency if the capacitance of the reverse biased variable capacitance device decreases; and
decreasing the pixel clock frequency if the capacitance of the reverse biased variable capacitance device increases.

14. The method according to claim 13, further comprising:
providing a master clock source;
electrically coupling a first binary counter to the master clock source;
electrically coupling an input of a second binary counter to the pixel clock;
electrically coupling a digital comparator to an output of the second binary counter;
comparing the output of the second binary counter with a predetermined reference count; and
generating the first signal based on a count of the first binary counter and a comparison of the count of the second binary counter with the predetermined reference count.

15. A video display circuit for overlaying characters with an underlying video signal for display on a display monitor, the video display circuit comprising:
a video controller, the video controller receiving a video input and overlaying character data onto the video input to create a video output;
a random access memory electrically coupled to the video controller, the random access memory storing the overlay character data;
a pixel clock generating circuit providing a clock for synchronizing retrieval of the overlay character data from the random access memory, the pixel clock generating circuit, comprising:
a digital circuit generating a first signal, the first signal corresponding to the relative frequency of the pixel clock as compared with a predetermined desired pixel clock frequency, and
an analog circuit electrically coupled to the digital circuit, the analog circuit comprising:
a reverse biased variable capacitance device having an anode and a cathode;
an integrator having an input coupled to the digital circuit and an output coupled to the cathode of the reverse biased variable capacitor, the integrator arranged to integrate the first signal received from the digital circuit and produce an output voltage across the reverse biased variable capacitance device such that the output voltage causes the capacitance of the reverse biased capacitor to change if the pixel clock is not operating at the predetermined desired pixel clock frequency; and a comparator circuit electrically coupled to the anode of the reverse biased variable capacitor, the comparator circuit producing the pixel clock having a frequency based on the capacitance of the reverse biased capacitor.

16. The video display circuit according to claim 15, wherein the output voltage causes the capacitance of the reverse biased variable capacitance device to decrease if the pixel clock frequency is slower than the predetermined desired pixel clock frequency and the output voltage causes the capacitance of the reverse biased variable capacitance device to increase if the pixel clock frequency is faster than the predetermined desired pixel clock frequency.

17. The video display circuit according to claim 16, wherein the reverse biased variable capacitance device is a reverse biased variable capacitance diode.

18. The video display circuit according to claim 16, wherein a decrease in the capacitance of the reverse biased variable capacitance device causes an increase in the pixel clock frequency and an increase in the capacitance of the reverse biased variable capacitance device causes a decrease in the pixel clock frequency.

19. The video display circuit according to claim 15, wherein the output voltage across the reverse biased variable capacitance device is based at least in part on a pulse width of the first signal.

20. The video display circuit according to claim 19, wherein the output voltage across the reverse biased variable capacitance device is further based at least in part on a polarity of the first signal.

21. The video display circuit according to claim 15, wherein the digital circuit includes:
    a master clock source;
    a first binary counter electrically coupled to the master clock source;
    a second binary counter having:
        an input electrically coupled to the pixel clock produced by the comparator circuit; and
        an output;
    a digital comparator electrically coupled to the output of the second binary counter, the comparator being arranged to compare the output of the second binary counter with a predetermined reference count; and
    a logic circuit electrically coupled to the digital comparator and the first binary counter, the logic circuit receiving digital signals from the digital comparator and the first binary counter, the logic circuit generating the first signal based on:
        a count of the first binary counter; and
        a comparison of the count of the second binary counter with the predetermined reference count.

22. The video display circuit according to claim 21, wherein the logic circuit includes an exclusive or (XOR) gate, the XOR gate producing an output signal based on a count signal received from the first binary counter and a signal received from the digital comparator corresponding to a condition in which a count of the second binary counter is greater than the predetermined reference count.

23. The video display circuit according to claim 22, wherein the logic circuit further includes an AND gate, the and gate being electrically coupled to the XOR gate to receive the output signal there from, the AND gate being arranged to produce an output signal based on a comparison of the signal received from the XOR gate with a composite synchronization signal.

24. The video display circuit according to claim 23, wherein the logic circuit further includes a tri-state buffer, the tri-state buffer having:
    a signal input arranged to receive a signal from the digital comparator corresponding to a condition in which a count of the second binary counter is less than the predetermined reference count, the XOR gate;
    a signal output; and
    an enabling input which, when activated, causes a signal present at that signal input to be substantially presented at the signal output, the enabling input being electrically coupled to the AND gate to receive the output signal there from.

* * * * *